United States Patent Office 3,546,288
Patented Dec. 8, 1970

3,546,288
PROCESS FOR MAKING 1,1-DIMETHYL-3-TETRA-
HYDRODICYCLOPENTADIENYL UREA
George A. Buntin, Faulkland Woods, Wilmington, and
Andrew John, Jr., North Star, Newark, Del., assignors
to Hercules Incorporated, Wilmington, Del., a corporation of Delaware
No Drawing. Filed Mar. 1, 1968, Ser. No. 709,792
Int. Cl. C07c 127/00
U.S. Cl. 260—553
7 Claims

ABSTRACT OF THE DISCLOSURE

In a process for making a product consisting essentially of 1,1-dimethyl-3-tetrahydrodicyclopentadienyl urea by catalytically hydrogenating material consisting essentially of 1,1-dimethyl-3-dihydrodicyclopentadienyl urea, the formamide content of the product is substantially reduced by admixing said material with dimethyl amine, the quantity of said dimethyl amine being at least substantially molecularly equivalent to said formamide content in the absence of dimethyl amine.

This invention relates to a process for making 1,1-dimethyl-3-tetrahydrodicyclopentadienyl urea.

1,1-dimethyl-3-tetrahydrodicyclopentadienyl urea is a compound having utility as a pre-emergence and post-emergence selective herbicide for use with cotton, sorghum and sugar cane. It can be made by a process, disclosed in the U.S. Pat. No. 3,163,674, to Buntin, in which material consisting essentially of 1,1-dimethyl-3-dihydrodicyclopentadienyl urea is synthesized and then subjected to catalytic hydrogenation to convert the dihydro compound to 1,1 - dimethyl - 3-tetrahydrodicyclopentadienyl urea.

Preferably the catalytic hydrogenation is carried out with the dihydro compound material dissolved in a relatively inert normally liquid reaction medium and at about 60–150° C. At the conclusion of the catalytic hydrogenation reaction, the hydrogenated material and the normally liquid reaction medium are separated. When the normally liquid reaction medium is separated by evaporation from the hydrogenated material, the product thus obtained consists essentially of 1,1-dimethyl-3-tetrahydrodicyclopentadienyl urea at a concentration of about ninety percent by weight of the product.

When this product is formulated into a wettable powder, the powder is readily wetted by and suspended in water for several weeks after the powder has been made. However, thereafter the powder ceases to be readily water wetted and suspended. The cause of this highly unsatisfactory condition has been traced to an impurity in the product, which is present at a concentration of 1–4% by weight of the product. This impurity comprises one or more compounds having the formamide radical. Investigation has revealed that this impurity is formed in the catalytic hydrogenation step.

A problem, therefore, to which this invention provides a solution, is how to minimize, if not eliminate, the formation of the formamide impurity in the catalytic hydrogentation step of this process.

In summary, this invention comprises admixing dimethyl amine with the dihydro compound material, the quantity of dimethyl amine admixed with the dihydro compound material being at least substantially molecularly equivalent to the formamide impurity content which the tetrahydro compound product would have if the dimethyl amine were not admixed with the dihydro compound material. The quantity of dimethyl amine can be as much as about 20% by weight of the dihydro compound material. Desirably, it is about 0.3–1.3% by weight of the dihydro compound material. However, more than about 20% is to be avoided when a hydrogenation catalyst like Raney nickel, for example, is used because the catalytic activity of the hydrogenation catalyst can be substantially adversely affected by dimethyl amine.

Upon admixture of this prescribed quantity of dimethyl amine with the dihydro compound material, the formamide impurity content of the product resulting from the catalytic hydrogenation of the dihydro compound material is substantially reduced.

In one embodiment of the process of this invention the dimethyl amine is admixed with the dihydro compound material simultaneously with the carrying out of the catalytic hydrogenation step. One way of doing this is to introduce the dimethyl amine as a gas along with the hydrogen into the hydrogenation reactor.

However, in a preferred embodiment of the process of this invention, the dimethyl amine is admixed with the dihydro compound material prior to subjecting the material to catalytic hydrogenation. While in the practice of this embodiment it is preferred that the admixture of dimethyl amine with the dihydro compound material take place at least several minutes (for example, about five minutes) prior to subjecting the material to catalytic hydrogenation, the admixture can take place just prior to subjecting the material to catalytic hydrogenation.

In another, but less preferred, embodiment of the process of this invention the dimethyl amine is incrementally admixed with the dihydro compound material. All of it can be incrementally admixed before subjecting the dihydro compound material to catalytic hydrogenation. On the other hand, but again less preferably, a portion of the dimethyl amine can be admixed prior to the catalytic hydrogenation step, and the remainder can be admixed simultaneously with the carrying out of the catalytic hydrogenation step.

Admixing of dimethyl amine with the dihydro compound material under the broad concepts of this invenion can be done in the absence of a liquid reaction medium, but in such case it is preferred that the mixing take place at a temperature at which the dihydro material is molten. On the other hand, it is preferred that the admixing occur in a relatively inert liquid reaction medium in which both the dihydro compound material and dimethyl amine are soluble, preferably the liquid reaction medium in which the material is to be subjected to catalytic hydrogenation, and preferably in a temperature range in which the dihydro material and dimethyl amine are substantially completely soluble in the liquid reaction medium. A suitable liquid reaction medium is toluene and in such case the temperature range generally is from about 60 to about 150° C. and preferably about 70–85° C.

The dimethyl amine can be added as such to the dihydro compound material. On the other hand, it can be added dissolved in a solvent. While water can be employed as the solvent, a substantially anhydrous solvent is preferred because water has been found to be a cause of formamide formation in the catalytic hydrogenation step, wherefore, in the preferred practice of this invention at least substantially anhydrous conditions are established and maintained during the catalytic hydrogenation step.

The concepts of this invention include not only practice of the process on a batch basis, but also practice of portions of the process or of the entire process on a continuous basis. In the continuous practice of at least the hydrogenation step of the process, dimethyl amine is continuously admixed with the dihydro compound material and the resulting mixture preferably in a preferably substantially anhydrous normally liquid relatively inert reaction medium is continuously introduced into a catalytic hydrogenation reactor containing either a fixed bed of hydrogenation catalyst or into which hydrogenation catalyst is continuously introduced (and in such case from which catalyst is continuously withdrawn).

Hydrogen is continuously introduced into the reactor and a reaction product is continuously withdrawn from the reactor. The catalytic hydrogenation is carried out in the reactor with the contents being established and maintained in a range from about 60 to about 150° C. and preferably at about 95–105° C. and with the ambient pressure (hydrogen pressure) being established and maintained generally in a range from about 1 to about 10,000 pounds per square inch gauge pressure, and preferably in a range from about 300 to about 500 pounds per square inch gauge pressure.

The best mode now contemplated for carrying out this invention is illustrated by the following example of various aspects of this invention, which include a preferred specific embodiment. This invention is not limited to this specific embodiment. In the example all parts and percentages are by weight.

EXAMPLE

A mixture of substantially anhydrous toluene (85 parts) and material (15 parts) consisting essentially of 1,1-dimethyl-3-dihydrodicyclopentadienyl urea and substantially anhydrous is stirred and heated until homogeneous. This typically occurs at about 62° C. Then 0.1 part of dimethyl amine is admixed with the homogeneous mixture.

After about five minutes the dimethyl amine treated mixture is transferred to a hydrogenation reactor fitted with an agitator and containing 10 parts of freshly activated lump Raney nickel in a stainless steel basket, which has been weighed out in methanol, rinsed in methanol and then twice in toluene. The reactor is sealed, flushed with nitrogen, flushed with hydrogen, and then charged with hydrogen at 300 pounds per square inch gauge pressure. The reactor contents are heated to 105° C. and with the agitator in operation are maintained at this temperature for 4 hours while maintaining the hydrogen gas pressure at 350–450 pounds per square inch gauge pressure.

At the end of this time the reactor is cooled to about 80° C., the pressure is released, and the reaction mixture is removed therefrom. Thereafter, at least substantially all of the toluene is separated by evaporation from the hydrogenated material.

The product thus obtained consists essentially of 1,1-dimethyl-3-tetrahydrodicyclopentadienyl urea at a typical concentration of about 92%. The formamide impurity content of the product typically is about 0.3–0.7% of the product. A wettable powder formulated from this product is readily wetted by and suspended in water for a substantially longer period of time than in the case of the wettable powder formulated from the tetrahydro compound product obtained under substantially the same conditions, but without the addition of dimethyl amine to the dihydro compound material. The latter product typically has a formamide impurity content of about 1–4% of the product.

Thus, the addition of dimethyl amine to the dihydro compound material substantially reduces the formamide impurity concentration of the tetrahydro product.

Moreover, the yield of the tetrahydro product is substantially increased in practicing the process of this invention.

Other features, advantages, and specific embodiments of this invention will be readily apparent to those exercising ordinary skill in the art after reading the foregoing disclosures. These embodiments are within the scope of this invention. In this connection, while a specific embodiment of this invention has been described in considerable detail, variations and modifications of this specific embodiment can be effected without departing from the spirit and scope of the invention as disclosed and claimed.

What we claim and desire to protect by Letters Patent is:

1. In a process for making a product consisting essentially of 1,1-dimethyl-3-tetrahydrodicyclopentadienyl urea by catalytically hydrogenating material consisting essentially of 1,1-dimethyl-3-dihydrodicyclopentadienyl urea, the improvement for substantially reducing the formamide impurity content of said product, which comprises admixing dimethyl amine with said material, the quantity of said dimethyl amine being at least substantially molecularly equivalent to the formamide impurity content which said product would have if said dimethyl amine were not admixed with said material.

2. A process according to claim 1, wherein the quantity of said dimethyl amine is insufficient to affect substantially adversely catalytic activity in said hydrogenation of said material.

3. A process according to claim 2, wherein said quantity is about 0.3–1.3% by weight of said material.

4. A process according to claim 3, wherein said material is in a quantity of toluene sufficient to dissolve substantially all of said 1,1-dimethyl-3-dihydrodicyclopentadienyl urea in the temperature range from about 60 to about 150° C.

5. A process according to claim 4, wherein said catalytic hydrogenating is carried out in a temperature range of about 60 to about 150° C.

6. A process according to claim 5, wherein said catalytic hydrogenating is carried out at about 95–105° C.

7. A process according to claim 2 wherein the maximum quantity of said dimethyl amine admixed with said material is about 20% by weight of said material.

References Cited

UNITED STATES PATENTS 3,163,674  12/1964  Buntin _____ 260—553

LEON ZITVER, Primary Examiner

M. W. GLYNN, Assistant Examiner

U.S. Cl. X.R.

71—119